United States Patent Office 3,149,129
Patented Sept. 15, 1964

3,149,129
BENZO-1,3-DIOXOLE DERIVATIVES
John Nicholson Gardner, Bloomfield, N.J., and George Lawrence Willey, Harpenden, England, assignors to Smith Kline & French Laboratories, Philadelphia, Pa., a corporation of Pennsylvania
No Drawing. Filed Dec. 17, 1962, Ser. No. 244,920
Claims priority, application Great Britain Dec. 22, 1961
7 Claims. (Cl. 260—340.5)

This invention relates to new benzodioxole derivatives having pharmacodynamic activity. More specifically this invention relates to 2-substituted benzo-1,3-dioxole derivatives having adrenergic nerve blocking, gangleonic blocking, antihistaminic, depressant or anticonvulsant activity.

The compounds of this invention are, for example, represented by the following formula:

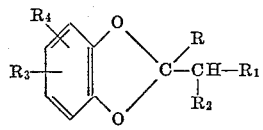

in which

R is hydrogen or methyl;

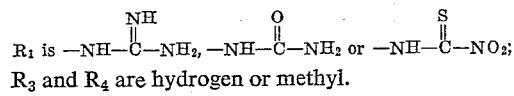

$R_3$ and $R_4$ are hydrogen or methyl.

Other "inert" nuclear substituents may be optionally present in place of the exemplary methyl substituents such as halo i.e. chloro, bromo or fluoro, methoxy, ethoxy, trifluoromethyl, methylthio etc. Also any isomers of the basic formulas presented are included in this invention.

When $R_1$ is the basic guanidino group salts may be optionally formed with nontoxic pharmaceutically acceptable acids such as with sulfuric, hydrochloric, phosphoric, maleic, ethanedisulfonic etc. acids. Such salts are formed by methods well known to the art.

The compounds of this invention are prepared from readily available starting materials as illustrated by the examples. In brief however the guanidine congeners are prepared from the corresponding amine salts by reaction with cyanamide while the ureas are prepared by reaction with sodium cyanate or thiocyanate.

As examples of the varied medicinal activity of the compounds of this invention the guanidines are potent adrenergic nerve blockers or antihistamines. The ureas on the other hand are potent depressants and anticonvulsants.

The preparation of these compounds, substituted or not, will be made apparent to one skilled in the art by the following examples.

Example 1

Catechol (220 g.) is dissolved in ethanolic sodium ethoxide (from 92 g. of sodium and three liters of absolute ethanol) and ethyl dichloracetate (314 g.) is added over one hour. The reaction mixture is heated under reflux for a further 6 hours and the ethanol then distilled off. Ether (1.2 l.) and 5% sodium bicarbonate solution (600 ml.) are added to the cooled residue and the ether is separated off and washed four times with 200 ml. of 5% sodium bicarbonate solution and then with 200 ml. of water. The ester 2-carbethoxy-1,3 benzodioxole (148 g.) is obtained from the ethereal solution and has a B.P. of 94–104° C./0.1 mm. (the product contained some catechol).

The ester prepared in the foregoing manner (25 g.) is shaken with aqueous ammonia (75 ml.). The reaction takes place exothermically and is complete in 10 minutes. After cooling in ice, the resulting amide, 1,3-benzodioxole-2-carbonamide, is isolated, washed with ice cold water and recrystallized from benzene yielding colorless plates (12.4 g.), M.P. 110–113° C.

The amide prepared in the foregoing manner (18.7 g.) is extracted from a Soxhlet thimble into a suspension of lithium aluminum hydride (9.1 g.) in boiling ether (200 ml.). After 24 hours (when all the amide has just dissolved) the reaction mixture is cooled and excess ethyl acetate is added to destroy excess lithium aluminum hydride. Saturated sodium sulfate solution is added until the precipitate adheres to the walls of the flask. The ethereal solution is decanted and extracted with 2 N HCl. The acid extract is basified with solid sodium carbonate and extracted with ether. Evaporation of the ether and distillation gives the desired 2-aminomethyl-1,3-benzodioxole (5.8 g.), B.P. 87–89° C./0.7 mm., $n_D^{25}$ 1.5477.

Alternatively methyl dichloropropionate or a carbonyl compound $RCOCHR_1R_2$ can be used with a vic. dihydroxybenzene in similar reactions.

The amine prepared above in ether (30 ml.) is treated with isopropanolic hydrogen chloride until the solution is acidic. The white solid which precipitates is filtered off, washed with ether and recrystallized from methanol/isopropanol giving 2-aminomethyl-1,3-benzodioxole hydrochloride as colorless plates, M.P. 207–245° C. (decomp.).

The amine hydrochloride (4.8 g.) and cyanamide (6.2 g.) in water (25 ml.) are heated under reflux for 19 hours. After cooling in ice for 4 hours the solution is filtered and the solids on the filter washed with ice-water.

The filtrate and washings are warmed to 40° C. and potassium bicarbonate (2.65 g.) is added. On cooling to 0° C. a precipitate forms which is filtered off, washed with ice-water, and resuspended in water (35 ml.) at 60° C. A mixture of nitric acid (2.5 ml.) and water (2.5 ml.) is added. On cooling the solution deposits crystals of the desired 2-guanidinomethyl-1,3-benzodioxole nitrate (3.0 g.) which is recrystallized from ethanol in prisms, M.P. 167–168.5° C. (decomp.).

Example 2

The amine hydrochloride prepared in the manner described in Example 1 (0.5 g.) is dissolved in water (2 ml.) and the resulting solution warmed to 60° C. Solid sodium cyanate (0.2 g.) is then added and the solution held at 60° C. for 30 minutes. On cooling, the desired 2-ureidomethyl-1,3-benzodioxole (0.4 g.) separates as colorless prisms, M.P. 97–97.5° C.

Substituting sodium thiocyanate gives the thiourea.

Example 3

3-methylcatechol (1.13 kg.) in sodium ethoxide (420 g. sodium in 13.5 liters ethanol) and under nitrogen is treated over 4 hours with ethyldichloroacetate (1.130 cc.). The reaction mixture is brought to reflux for 6 hours, after which most of the ethanol is removed by distillation. The residue is cooled, dissolved in ether (6.5 liters) and the ethereal solution washed with 5% aqueous sodium bicarbonate (9 x 4 liters) followed by water (2 x 2 liters). The ethereal solution is dried over magnesium sulfate, the ether evaporated and the residue distilled to give 2-carbethoxy-4-methyl-1,3-benzodioxole (740 g.). The product is freed from a little 3-methylcatechol by filtration of a benzene solution through alumina. The pure material has B.P. 92° C./0.3 mm., $[n]_D^{25}$ 1.5050.

The ester (100 g.) prepared as above is shaken with 10% aqueous ammonia (325 cc.) for 15 minutes. The precipitated solid is isloted and crystallized from benzene to give 4-methyl-1,3-benzodioxole-2-carbonamide (42 g.) as needles, M.P. 109–110° C.

The above amide (5 g.) is reduced with lithium aluminum hydride (5 g.) in ether (150 cc.) and a reaction time of 24 hours. The desired 2-aminomethyl-4-methyl-1,3-benzodioxole (5 g.) is obtained as an oil, B.P. 63° C./0.05 mm.

The amine (21 g.) in ether (250 cc.) is treated with excess isopropanolic hydrogen chloride. The precipitated 2-amino-methyl-4-methyl-1,3-benzodioxole hydrochloride (24 g.) crystallizes from methanol-ether as needless, M.P. 219–220° C.

The hydrochloride in water (60 cc.) is refluxed with cyanamide (10 g.) for 24 hours. The solution is cooled to 0° C., filtered, the filtrate warmed to 50° C. and treated with potassium bicarbonate (5 g.). The precipitated solid is isolated, suspended in warm water (40 cc.) and nitric acid (concentrated acid plus an equal volume of water) added until the solution is acidic. On cooling 2-guanidinomethyl-4-methyl-1,3-benzodioxole nitrate (7.5 g.) crystallizes and is obtained as needles, M.P. 179–180° C., after crystallization from water. The base is regenerated by shaking in chloroform-bicarbonate solution. Other salts such as the hydrochloride are made by reacting the base with an excess of acid in organic solvents.

*Example 4*

The amine hydrochloride (1 g.) prepared as in Example 3 in water (2.3 cc.) at 60° C. is treated with sodium cyanate (0.42 g.). The precipitated 2-ureidomethyl-4-methyl-1,3-benzodioxole (1.0 g.)) crystallizes from water as needles, M.P. 125–126° C.

*Example 5*

3,6-dimethylcatechol (23.0 g.) in sodium ethoxide (9.6 g. sodium in 325 cc. ethanol) under an atmosphere of nitrogen is treated with ethyl dichloroacetate (32.8 g) over 20 minutes. The mixture is then heated at reflux for 6 hours and stirred at room temperature for a further 8 hours after which most of the ethanol is distilled off. The residue is dissolved in ether (200 cc.), decanted from tar, and the ethereal solution washed with 5% aqueous sodium bicarbonate. Evaporation of the ethereal solution and distillation of the residue gives an oil (8 g.), B.P. 90–130° C./0.1–0.4 mm. which is dissolved in benzene and filtered through alumina. Removal of the benzene and distillation of the residue gives pure 2-carbethoxy-4,7-dimethyl-1,3-benzodioxole (5 g.), B.P. 77–80° C./0.2 mm., $[n]_D^{27}$ 1.4991, M.P. 22–24° C. (after crystallization from methanol at −70° C.).

The ester (4.5 g.) in methanol (35 cc.) at −11° C. is treated with ice-cold ammonia (41 cc.). After 2 hours at 0° C. the mixture is diluted with water and the precipitated solid isolated. Crystallization of this from aqueous methanol gives 4,7-dimethyl-1,3-benzodioxole-2-carbonamide (2,3 g.) as plates, M.P. 156–159° C.

The above amide (4 g.) in ether (100 cc.) is added to lithium aluminum hydride (1 g.) in ether (20 cc.) and the mixture heated at reflux for 24 hours. Isolation of the product as described above gives the desired 2-aminomethyl-4,7-dimethyl-1,3-benzodioxole (2.1 g.) as an oil, B.P. 108° C./2 mm.

The amine (5 g.) in ether (20 cc.) is treated with excess isopropanolic hydrogen chloride and the precipitated solid isolated. Crystallization of this from ethanol-ether gives 2-aminomethyl-4,7-dimethyl-1,3-benzodioxole hydrochloride (5 g.), M.P. 274–275° C.

The amine hydrochloride (2 g.) in water 12( cc.) at 60° C. is treated with sodium cyanate (0.7 g.) and the precipitated solid isolated. Crystallization of this from ethanol gives 4,7 - dimethyl - 2-ureidomethyl-1,3-benzodioxole (1.8 g.) as plates, M.P. 195–196° C.

*Example 6*

The amine hydrochloride (1.0 g.) prepared as in Example 5 in water (12 cc.) is refluxed with cyanamide (1.0 g.) for 24 hours. After cooling at 0° C. the reaction mixture is filtered and potassium bicarbonate (0.5 g.) added to the filtrate. The precipitated solid is isolated, suspended in water (4 cc.) and treated with 2 N nitric acid (5 cc.). The desired 4,7-dimethyl-2-guanidinomethyl-1,3-benzodioxole nitrate (1.2 g.) recrystallizes on cooling and is recrystallized from water as needles, M.P. 183° C.

What is claimed is:
1. A compound of the structure:

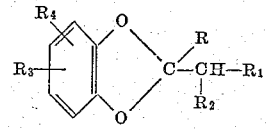

in which:

R, $R_2$, $R_3$ and $R_4$ are members selected from the group consisting of hydrogen and methyl; and $R_1$ is a member selected from the group consisting of guanidino, ureido and thioureido.

2. 2-guanidinomethyl-1,3-benzodioxole.
3. 2-ureidomethyl-1,3-benzodioxole.
4. 2-guanidinomethyl-4-methyl-1,3-benzodioxole.
5. 2-ureidomethyl-4-methyl-1,3-benzodioxole.
6. 2-ureidomethyl-4,7-dimethyl-1,3-benzodioxole.
7. guanidomethyl-4,7-dimethyl-1,3-benzodioxole.

References Cited in the file of this patent

Druey, Bull. Soc. Chim., 5 series, vol. 2, pp. 2261–4 (1935).

Christiansen et al.: J. Am. Chem. Soc., vol. 66, p. 312 (1944).